Sept. 12, 1961  J. E. MARTENS  2,999,412
TWO PART RING WITH LUG AND RECESS RETAINING MEANS
Filed March 17, 1958

INVENTOR.
JACK E. MARTENS
BY
W. E. Recktenwald
ATTORNEY

United States Patent Office 2,999,412
Patented Sept. 12, 1961

2,999,412
TWO PART RING WITH LUG AND RECESS RETAINING MEANS
Jack E. Martens, Gary, Ind., assignor to The Anderson Company, a corporation of Indiana
Filed Mar. 17, 1958, Ser. No. 721,764
2 Claims. (Cl. 85—8.8)

This invention relates to fastening devices and more particularly to an improved lock type retaining and spacing ring.

Currently, many different types of fastening devices are used to secure end mounts, bearings, gears and the like onto a shaft. Typical of such devices are resilient snap rings, resilient C-washers, lock nuts, cotter keys, and many others. When using the resilient type snap rings or C-washers, it is necessary to tailor the width and depth of the retaining groove for receiving the rings or washers so as not to place an excessive stress on the rings or washers when assembling them on the shaft. It has been found that the rings or washers frequently wear out and break due to the pounding and rubbing contact with some of the associated parts of an assembly. Some of the other types of fastening devices require special threading of the shaft end, drilling of holes, or cutting of keyways for fastening the attachment means to the shaft. These devices are all either expensive, time consuming to install or inefficient.

It is, therefore, a principal object of this invention to overcome the above-noted disadvantages of the prior art and to provide an improved fastening device which is positive in its retaining action.

It is another object of this invention to provide an improved fastening device having overlapping interfitting parts which combine to produce a unitary retaining structure.

It is still another object of this invention to provide an improved fastening device which has increased wearing capabilities and improved capacities to retain members in assembled position on a shaft.

It is a further object of this invention to provide an improved fastening device which is not only simple in design and construction but also is compact, making it practical for use in situations where only limited space is available.

It is still a further object of this invention to provide an improved fastening device which is inexpensive to manufacture and install, and is highly efficient in use.

And a further object of this invention is to provide an improved device that is constructed in such a way as to be capable of use as a highly practical shimming or spacer device.

A still further object of this invention is to provide an improved two-piece fastening device which is held together by the coaction of certain parts of the pieces and by coaction with the walls of a seating groove.

Additional objects and features of the invention will become evident when the description hereinafter set forth is considered in conjunction with the drawing annexed hereto.

Figure 1:
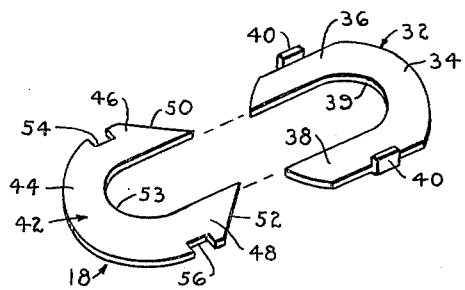
FIGURE 1 is a perspective view of the parts of my invention in an exploded disassembled position.

The invention as mentioned above may be utilized wherever applicable, but, as illustrated in FIGURES 1–4 of the drawings, is operatively associated with one end of a threaded shaft. Referring particularly to FIGURES 1–4 of the drawing, there is shown, among other things, a screw member or shaft 10 having a reduced end portion or shank 12 integral therewith to form an axially facing shoulder 14. An end thrust-type bearing 16 is shown seated about the shank 12 and against the shoulder 14.

Figure 4:
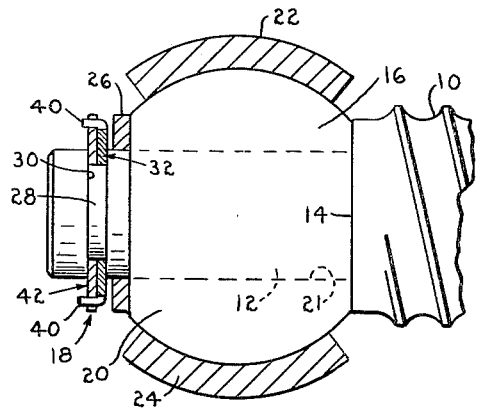
FIGURE 4 is a side view of FIGURE 3 with parts in section.

The particular end thrust bearing is of the spherical ball type, although it is obvious that any type of bearing or other device can be positioned on the shank 12 between a lock ring or fastening device 18 and the shoulder 14, as illustrated in FIGURE 4 or between two fastening devices 18 or between any combination thereof. For illustration purposes, the bearing 16 comprises a substantially spherically shaped ball portion 20 which has an aperture 21 through the center thereof for reception of the reduced end portion or shank 12 of the screw member 10. The ball 20 generally is composed of bearing type material such as bronze, babbitt, or the like. A pair of mating retaining members 22, 24 encase the outer periphery of the ball 20 and are adapted to be attached to a fixed member for positioning the end of the shaft in position for operation. The construction of the spherical bearing makes it possible to easily position the end of a shaft relative to a mounting due to its self-aligning features. A nylon or the like type washer 26 is positioned about the shank 12 and against the outer end of the ball 20 to protect the bearing against abrasion or damage. Near the outer end portion of the shank 12 of the shaft 10 is a concentric groove 28 which has a pair of parallel spaced-apart walls or abutment surfaces 30 defining the axial sides of the groove.

Figure 2:
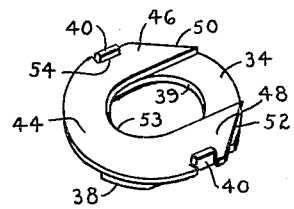
FIGURE 2 is a perspective view of the parts of FIGURE 1 in assembled position.
Figure 3:
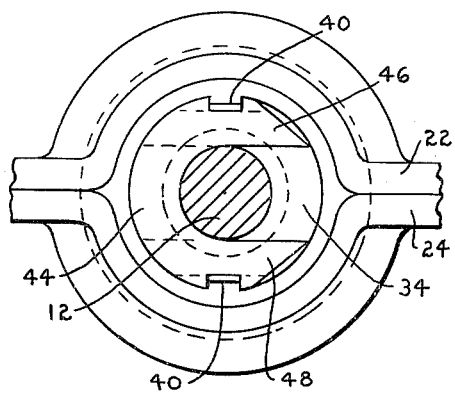
FIGURE 3 is an end view of the lock rings assembled on the end of a shaft for retaining a bearing element in position.

The lock ring or fastening device 18 seated in the groove 28, forms the principal part of this invention and is best illustrated in FIGURES 1 and 2. The fastening device comprises a two-piece structure, one of said pieces being a substantially U-shaped male member 32 made of resilient material having a base portion 34 and a pair of substantially parallel leg portions 36, 38. The base portion and leg portions all lie in substantially the same plane. A pair of lugs or ears 40 are struck upwardly from the outer edges of the leg portions 36, 38 and are adapted to extend any desired distance above the plane of the U-shaped male member. The internal opening 39 between the legs 36, 38, in the vicinity of the base 34, is illustrated as circular in form, although it is to be understood that the shape may be square, or any other desired shape depending upon the corresponding shape of the member with which the fastening device is to be used.

The second piece of the two-piece structure comprises a substantially U-shaped female member 42 having a base portion 44 and a pair of parallel leg portions 46, 48 extending therefrom and lying in substantially the same plane as the base portion 44. The respective leg portions 46, 48 have gradually sloping forwardly disposed guide portions 50, 52 which taper from a high point in the central portion of the female member 42 to a low point near the outer edges of said leg portions 46, 48. A pair of notches 54, 56 are formed in the outer edges of the legs 46, 48, respectively, and are aligned with each other and are substantially closely positioned with respect to the low point of the guides 50, 52. Once again, the internal shape 53 of the female member 42 is illustrated as being circular although it can be any desired shape depending upon the shape of the member with which the fastening device is to be used.

To assemble the fastening device, the U-shaped male member 32 is first positioned in the groove 28 with the leg portions 36, 38 straddling the shank 12 and with the curved internal portion 39 seated against the base of the groove of the shaft. One surface of the male member 32 engages with the abutting wall 30 of the groove such that the tabs 40 extend in the opposite direction. The female member 42 is inserted from the opposite side of the shank 12 in juxtaposed relation to the other surface of the male member 32. The leg portions 46, 48 of the female member straddle the shank 12 with the guides 50, 52 aligned with the tabs 40 on the male member. Slight pressure on the male member and the female member toward each other cams the tabs 40 up the guides 50, 52 until the tabs 40 snap into the notches 54, 56 of the female member 42. The abutment walls 30 of the groove 28 coact with the respective outwardly disposed surfaces of the U-shaped male and female members to prevent axial separation of said male and female members. The male and female members are securely locked together in a radial direction by the coaction of the tabs and notches whereupon an efficient and simple fastening device is produced.

The present invention provides a lock ring that is at least twice as thick in certain critical areas where the members overlap so as to better withstand the pounding and rubbing contact to which it is subjected during certain types of uses. That is, in a typical application, the bearing-mounted shaft 10 of FIGURE 4 is mounted vertically for rotational movement with a load-carrying nut assembly axially movable on the shaft. As the direction of rotation of the shaft is reversed, the bearing 20 will pound against either the shoulder 14 or the lock ring 18 tending to load and stress the lock ring 18 a great amount. The lock ring 18 has been found to be able to satisfactorily withstand this and many other types of unusually difficult conditions of use.

Figure 5:
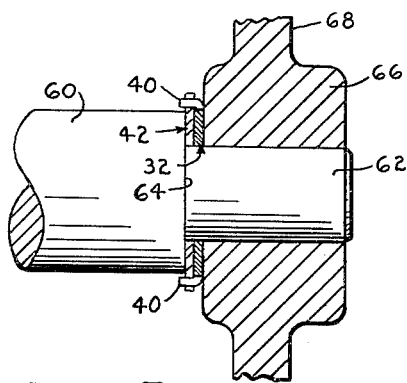
FIGURE 5 is a view showing the lock rings being used as a spacer or shim member.

FIGURE 5 shows a modified use of the device of my invention wherein a shaft 60 has a reduced end shank 62 integrally formed therewith to provide a shoulder 64. A hub 66 of a wheel 68 is asembled over the shank 62. Occasionally, it is necessary to shim or otherwise space the wheel 68 farther out on the shank from the shoulder 64 than was originally believed necessary. The device of the present invention provides a very efficient shimming arrangement without the need for disassembling the wheel from the shank. That is, a male member 32 is inserted between the shoulder 64 and the abutment surface of the hub 66 of the wheel 68 whereupon one or more female members 42 are inserted in front of the male member to provide the appropriate spacing between the wheel and the shoulder of the shaft.

The longitudinal dimension or thicknesses of the male member 32 and the female members 42 can be accurately controlled during manufacture whereupon a predetermined number of female members can be superimposed one upon the other relative to the male member 42 until the desired size of shim or spacer is produced. The only modification required between the fastening device of FIGURES 1–4 and the shimming device of FIGURE 5 relates to the length of the tabs 40 provided on the male member 32. That is, since it may be necessary to use several female members 42 superimposed upon the male member 32 to produce a requisite longitudinal dimension for a shim, it is desirable to provide the male member with tabs 40 of adequate length so as to accommodate the female members relative to said male member. It is obvious that this shimming principle can be used in any device wherein spacers are to be added between two members to space one of the members longitudinally relative to another member.

Having thus described my invention, it is obvious that various other modifications may be made in the same without departing from the spirit of my invention; hence, I do not wish to be understood as limiting myself to the exact forms, constructions, arrangements, and combinations of parts herein shown and described or uses mentioned.

I claim:

1. A self-locking two piece fastening device wherein the two pieces are adapted to be inserted radially into a peripheral groove in a shaft from opposite sides thereof and snapped into locking engagement with each other in cooperative relationship with said groove, comprising a first generally U-shaped flat piece having a notch in the outer edge of each leg of the U and the end surface of each leg being inclined inwardly from the outer edge to the inner edge of the leg to provide a cam surface at the free end of each leg of the U, and a second generally U-shaped flat piece of resilient material having an upstanding lug formed integrally on the outer edge of each leg of the U, said first and second U-shaped pieces being adapted to straddle the shaft in superposed relationship as they are moved toward each other into said groove from opposite sides of the shaft, and said lugs on said second piece being spaced apart less than the distance between the outer edges of the legs of said first piece with said lugs at first being in alignment with said notches in said first piece in the direction of application of said pieces and being temporarily forced out of alignment with said notches by said cam surfaces on said first piece as the two pieces are moved progressively toward each other to resiliently deform said second piece and effect snapping of the lugs into the notches as the lugs reach a position of alignment with said notches in the radial direction perpendicular to the direction of application.

2. A self-locking two member fastening device wherein the two members are adapted to be inserted radially toward a shaft from opposite sides thereof to encompass a preformed peripheral groove therebetween and snapped into locking engagement with each other in cooperative relationship with said groove comprising; a first of the two members having a U-shaped flat body of uniform thickness lying substantially in a single plane defined by a pair of extending legs having outer edges and parallel inner edges, a recess in each outer edge, said outer and inner edges of each leg being terminated in an end surface inclined inwardly from the outer edge to the inner edge, said legs being connected by a base portion, a second of the two members having a U-shaped flat body of uniform thickness lying substantially in a single plane defined by a pair of legs having parallel outer and inner edges, said parallel legs being connected by a base portion, and each having an upstanding lug integral therewith lying outside its outer edge substantially perpendicular to the plane, said legs of the first and second U-shaped members adapted to straddle said preformed groove in superposed relationship as said members are moved toward each other, said legs of at least the second member being resilient, and the lugs on said legs being spaced apart less than the distance between the outer edges adjacent the recesses on the first member and in alignment with the recesses in said first member in the direction of application of said members and being guided into the recesses by the inclined surfaces on the first member for self-locking engagement therebetween.

References Cited in the file of this patent

UNITED STATES PATENTS

| 320,392 | Peterson et al. | June 16, 1885 |
| 706,071 | La Bauve | Aug. 5, 1902 |
| 885,052 | Jensen | Apr. 21, 1908 |
| 2,192,165 | Caldwell | Feb. 27, 1940 |

FOREIGN PATENTS

| 820,658 | Germany | Nov. 12, 1957 |